(12) United States Patent
Kim et al.

(10) Patent No.: US 8,379,573 B2
(45) Date of Patent: Feb. 19, 2013

(54) APPARATUS AND METHOD FOR NETWORK MOBILITY MANAGEMENT IN PROXY MOBILE IPV6 NETWORK

(75) Inventors: Young-Han Kim, Seoul (KR); Se-Il Jeon, Seoul (KR)

(73) Assignee: Foundation of Soongsil University-Industry Cooperation, Seoul (KR)

( * ) Notice: Subject to any disclaimer, the term of this patent is extended or adjusted under 35 U.S.C. 154(b) by 385 days.

(21) Appl. No.: 12/849,962

(22) Filed: Aug. 4, 2010

(65) Prior Publication Data
US 2011/0032874 A1     Feb. 10, 2011

(30) Foreign Application Priority Data

Aug. 5, 2009   (KR) .................. 10-2009-0071891

(51) Int. Cl.
*H04W 4/00*     (2009.01)
*H04L 12/28*    (2006.01)

(52) U.S. Cl. .................. 370/328; 370/338; 370/401

(58) Field of Classification Search ........... 370/310–350
See application file for complete search history.

(56) References Cited

U.S. PATENT DOCUMENTS

| | | | |
|---|---|---|---|
| 2010/0272062 A1* | 10/2010 | Velev et al. ................. | 370/331 |
| 2010/0296445 A1* | 11/2010 | Sarikaya et al. ............. | 370/328 |
| 2011/0103340 A1* | 5/2011  | Zhu et al. .................... | 370/329 |

FOREIGN PATENT DOCUMENTS

WO   WO2008/046655   * 4/2008

* cited by examiner

*Primary Examiner* — Warner Wong
(74) *Attorney, Agent, or Firm* — William Park & Associates Ltd.

(57) ABSTRACT

Provided is a network mobility management apparatus for providing mobility in a proxy mobile Internet Protocol (IP) network of mobile nodes which configure a mobile network. The network mobility management apparatus includes an address generation unit and a communication unit. The address generation unit transmits a router request message to a mobile access gateway of a proxy mobile IP network to be accessed by the mobile nodes, and receives a router advertisement message containing a home network prefix to generate an address. The communication unit transmits a proxy binding update message containing the home network prefix and an identification code of the mobile node to the mobile access gateway when the router request message is received from the mobile node, and includes the mobile home network prefix, which is contained in a proxy binding response message received from the mobile access gateway and is for the mobile node, in the router advertisement message to transfer the mobile home network prefix to the mobile node.

24 Claims, 8 Drawing Sheets

| 0 | | | | | | | | | | 1 | | | | | | | | | | 2 | | | | | | | | | | 3 | |
|---|---|---|---|---|---|---|---|---|---|---|---|---|---|---|---|---|---|---|---|---|---|---|---|---|---|---|---|---|---|---|---|
| 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 |

| Type | Code | | Checksum |
|---|---|---|---|
| Cur Hop Limit | M | O | Reserved | Router Lifetime |
| mMAG Home Network Prefix Option ||||
| Mobile Network Node (MNN) Home Network Prefix Option #1 ||||
| Mobile Network Node (MNN) Home Network Prefix Option #2 ||||

FIG. 10

APPARATUS AND METHOD FOR NETWORK MOBILITY MANAGEMENT IN PROXY MOBILE IPV6 NETWORK

CROSS-REFERENCE TO RELATED APPLICATION

This application claims priority to Korean Patent Application No. 10-2009-0071891 filed on Aug. 5, 2009, and all the benefits accruing there from under 35 U.S.C. §119, the contents of which are incorporated by reference in their entirety.

BACKGROUND

The present disclosure relates to an apparatus and a method for network mobility management in a proxy mobile IPv6 network, and more particularly, to an apparatus and a method for supporting network mobility using only PMIPv6 protocol with respect to a mobile node in which a mobile IP function is not implemented.

A network mobility management scheme is technology that effectively provides the mobility management of a plurality of mobile nodes having the same mobility pattern and solves the coverage limitations of the mobile nodes using a Wi-Fi access scheme through the interworking of Worldwide Interoperability for Microwave Access (WiMAX) and High-Speed Downlink Packet Access (HSDPA). The existing network mobility management is performed by including the function of mobile IPv6 in a Mobile Router (MR). In the mobile IPv6, when a mobile node senses that it has moved from one network to another network, it performs an operation that has been defined in the mobile IPv6. That is, the mobile IPv6 is a node-based mobility support protocol.

However, the mobile IPv6 senses the moving of a mobile node and resets an Internet Protocol (IP) address based on the sensed result, whereupon a delay time occurs. Furthermore, delay time issues grow serious because binding update is transmitted through a wireless section from a terminal. Therefore, technology has been proposed for supporting the mobility of nodes in an access network in order for preset-connection to be maintained even when a mobile node having no mobile IPv6 function is moved. Such a technology is called a network-based mobility management scheme.

As a protocol for providing network-based mobility management, a Proxy Mobile IPv6 (PMIPv6) protocol has been standardized. In the PMIPv6, a network performs the sensing of mobility required by mobile nodes, and the resetting of an IP address is not required in the same PMIPv6 domain. Consequently, merely by including an IPv6 protocol in a mobile node, high-speed mobility management is made. For providing PMIPv6-based network mobility, however, support should be provided over PMIPv6 network without a mobile IP in a mobile router, and a unique prefix allocation scheme is required for an individual mobile node. Also, the minimizing of handover signaling cost is required as the advantage of network-based mobility management.

Figure 1:
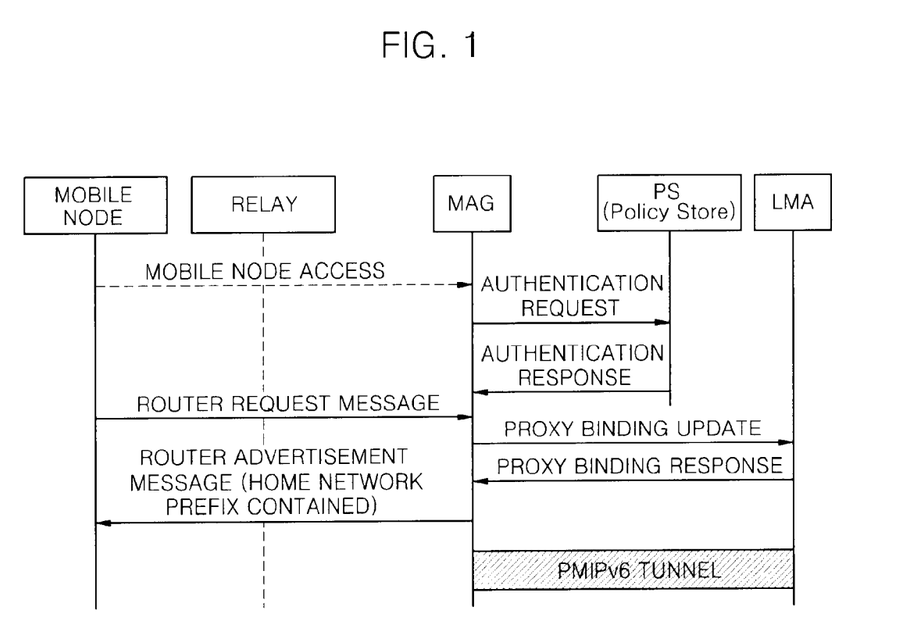
FIG. 1 is a diagram illustrating management procedure according to an existing relay-based Network Mobility Management Technique (rNEMO)

FIG. 1 is a diagram illustrating management procedure according to an existing relay-based Network Mobility Management Technique (rNEMO).

Referring to FIG. 1, in the rNEMO, a relay included instead of the existing mobile router performs only the necessary relay function of signal processing between a mobile node and a Mobile Access Gateway (MAG), and thus network mobility may be supported without correcting the basic procedure of PMIPv6. Even in aspects of packet transfer, moreover, an operation of adding and removing a tunnel header is omitted, and thus detour traffic is reduced.

However, when a mobile network including many mobile nodes moves to another MAG, all mobile nodes included in a mobile network should access a new MAG. This is the same as the occurrence of signaling for the mobile management control procedures of the existing individual mobile nodes, and therefore the advantage of network mobility is removed.

Accordingly, efficiency improves compared to rNEMO in aspects of handover signaling, and a new applicable network mobility management scheme is required in PMIPv6 without mobile IPv6.

SUMMARY

The present disclosure provides an apparatus and a method for network mobility management in a proxy mobile IPv6 network, which can manage mobility of a mobile node and minimize a handover signaling cost under a proxy mobile IPv6 environment without using related-art mobile IPv6 functions According to an exemplary embodiment, a network mobility management apparatus for providing mobility in a proxy mobile Internet Protocol (IP) network of mobile nodes which configure a mobile network comprises: an address generation unit transmitting a router request message to a mobile access gateway of a proxy mobile IP network to be accessed by each mobile node, and receiving a router advertisement message containing a home network prefix to generate a network address; and a communication unit transmitting a proxy binding update message containing the home network prefix and an identification code of the mobile node to the mobile access gateway when the router request message is received from the mobile node, and adding a mobile home network prefix, which is contained in a proxy binding response message received from the mobile access gateway and is for the mobile node, to a router advertisement message to be transferred to the mobile node.

According to another exemplary embodiment, a network mobility management method for providing mobility in a proxy mobile Internet Protocol (IP) network of mobile nodes which configure a mobile network includes: transmitting a router request message to a mobile access gateway of a proxy mobile IP network to be accessed by each mobile node, and receiving a router advertisement message containing a home network prefix to generate a network address; transmitting a proxy binding update message containing the home network prefix and an identification code of the mobile node to the mobile access gateway when the router request message is received from the mobile node; and adding a mobile home network prefix, which is contained in a proxy binding response message received from the mobile access gateway and is for the mobile node, to a router advertisement message to be transferred to the mobile node.

BRIEF DESCRIPTION OF THE DRAWINGS

Exemplary embodiments can be understood in more detail from the following description taken in conjunction with the accompanying drawings, in which.

DETAILED DESCRIPTION OF EMBODIMENTS

Hereinafter, specific embodiments of an apparatus and a method for network mobility management in a proxy mobile IPv6 network will be described in detail with reference to the accompanying drawings.

Figure 2:
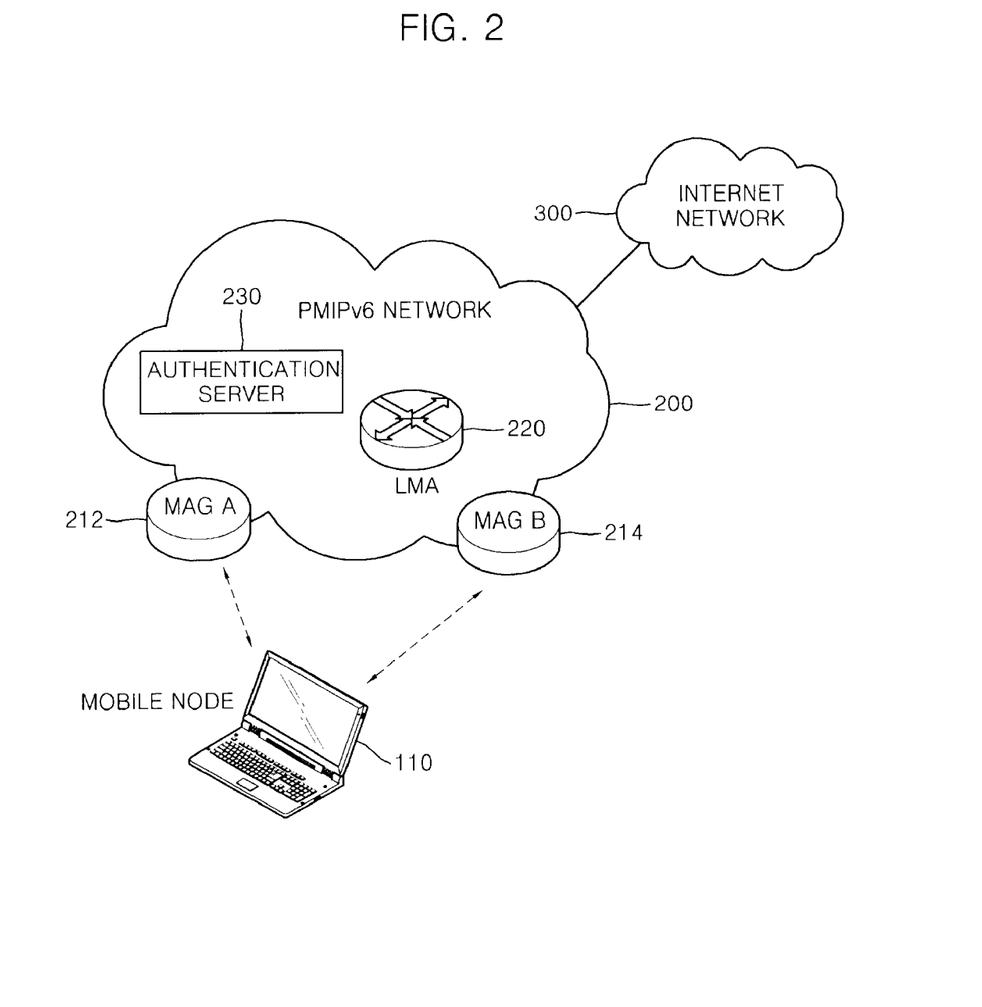
FIG. 2 is a diagram illustrating a configuration of a related-art Proxy Mobile IPv6 (PMIPv6) network connected to a mobile node and an Internet network.

FIG. 2 is a diagram illustrating a configuration of a related-art Proxy Mobile IPv6 (PMIPv6) network connected to a mobile node and an Internet network.

Referring to FIG. 2, a PMIPv6 network 200 may be connected to a mobile node 110 and an Internet network 300 to perform data transmission therebetween. The PMIPv6 network 200 may include Mobile Access Gateways (MAG) 212 and 214, a Local Mobility Anchor (LMA) 220, and an authentication server 230. The MAGs 212 and 214 may be a kind of gateway requested for access from the mobile node 110. The LMA 220 may be a kind of anchor for managing mobility of the mobile node 110. The authentication server 230 may perform authentication for the mobile node 110.

The mobile node 110 may be portable apparatuses such as wireless transceivers, mobile communication terminals including antennas and controllers, Personal Digital Assistants (PDAs), and notebooks. The mobile node can wirelessly access the MAGs 212 and 214 through a wireless transceiver. Also, the mobile node 110 may access the MAGs 212 and 214 in the PMIPv6 network 200 to be provided with network access services. The mobile node 110 may set its own IP address by receiving a router advertisement message from the MAGs 212 and 214 that the mobile node 110 has accessed.

The MAGs 212 and 214 may be apparatuses for supporting mobility of the mobile node 110. The MAGs 212 and 214 may detect movement of the mobile node 110, and may transmit a proxy binding message to the LMA 220. When a network registration of the mobile node 110 is successful by processing of the proxy binding message in the LMA 220, the proxy binding message containing network prefix information of the mobile node 110 may be transmitted to the MAGs 212 and 214. Accordingly, the MAGs 212 and 214 may transmit the router advertisement message to the mobile node 110 by using the network prefix received from the LMA 220. The binding message may be a message regarding binding information. The binding information may include information on which MAGs 212 and 214 the mobile node 110 has accessed the LMA 220 through. Examples of binding messages may include Proxy Binding Update (PBU) messages and Proxy Binding Acknowledgement (PBA) messages.

The LMA 220 may serve as a kind of home agent for the mobile node 110 in a network. The home agent refers to an agent that serves to bind and store a Home Address (HoA) and a Care-of Address (CoA) temporarily representing the locations of mobile nodes in mobile IP technologies. LMA 220 may update the binding information based on the proxy binding message received from the MAGs 212 and 214, and may perform functions such as establishment, maintenance, and cancellation of an access path to the mobile node 110 based on the binding information.

The authentication server 230 may authenticate the mobile node 110 using various authentication protocols including protocols such as Remote Access Dial-in User Service (RADIUS) and Diameter. Regarding the authenticated mobile node 110, an access acceptance message containing address information of the LMA 220 may be generated to allow the mobile node 110 to access a corresponding domain.

Along with studies on provision of PMIPv6-based mobility regarding the individual mobile node 110 described above, studies on mobility of a mobile network that is a cluster of various mobile nodes are being extensively conducted in recent years. A network mobility management apparatus in a PMIPv6 network may provide more efficient mobility for a mobile network, and may be implemented in a separate apparatus processing handover to provide endless high-speed handover for the mobile network.

Figure 3:
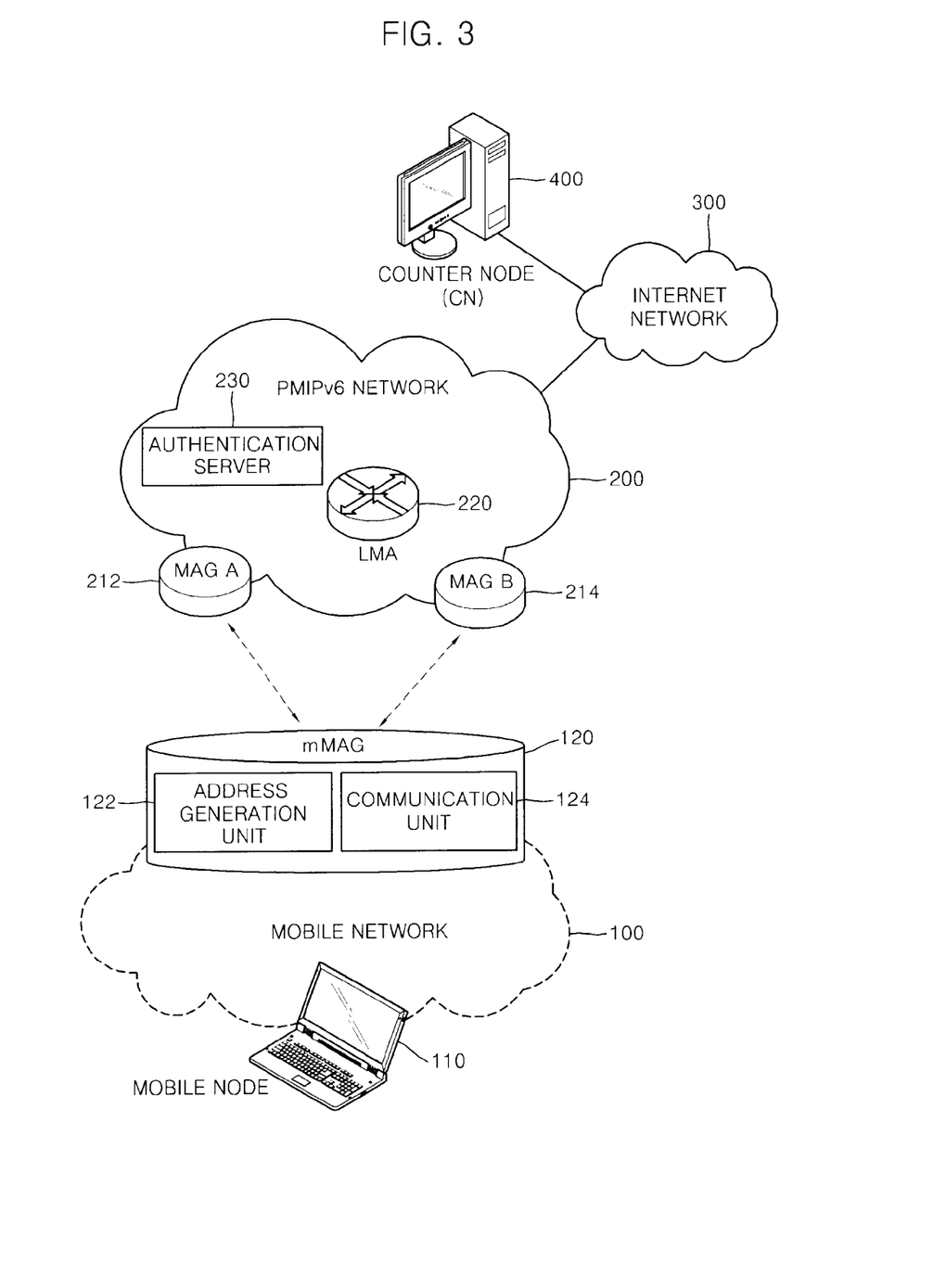
FIG. 3 is a diagram illustrating a configuration of a network including a network mobility management apparatus in a PMIPv6 network according to an exemplary embodiment.

FIG. 3 is a diagram illustrating a configuration of a network including a network mobility management apparatus in a PMIPv6 network according to an exemplary embodiment.

Referring to FIG. 3, a PMIPv6 network 200 may connect a mobile network 100 to an Internet network 300. As described above, the mobile network 100 refers to a network in which one or more mobile nodes 110 may form a certain cluster to move in the same direction. The network mobility management apparatus 120 may be connected to a plurality of mobile nodes 110 in the mobile network 100 to provide mobility for the PMIPv6 network 200. For convenience of explanation, the network mobility management apparatus 120 may be defined as Mobile MAG (hereinafter, referred to as mMAG) corresponding to a plurality of MAGs 212 and 214 of the PMIPv6 network 200.

The mMAG 120 may include an address generation unit 122 and a communication unit 124. The address generation unit 122 may access the MAGs 212 and 214 of the PMIPv6 network 200 to perform a function of generating an address of the mMAG 120, and the communication unit 124 may perform a function of delivering messages between the mobile node 110 and the MAGs 212 and 214 upon access of the mobile node 110 to the MAGs 212 and 214. Compared to FIG. 2 showing a configuration of a typical network, the configurations of both networks may be identical to each other except that the mMAG 120 are newly added with respect to the plurality of mobile nodes 110 constituting the mobile network 100. In such a network configuration, the mMAG 120 may be located between the mobile node 110 and the PMIPv6 network 200 to manage registration and handover of the mobile node 110 to the PMIPv6 network 200.

Hereinafter, an initial registration process of the mMAG 120 on MAG A 212 will be described, and then a handover process from the MAG A 212 to the MAG B 214.

Figure 4:
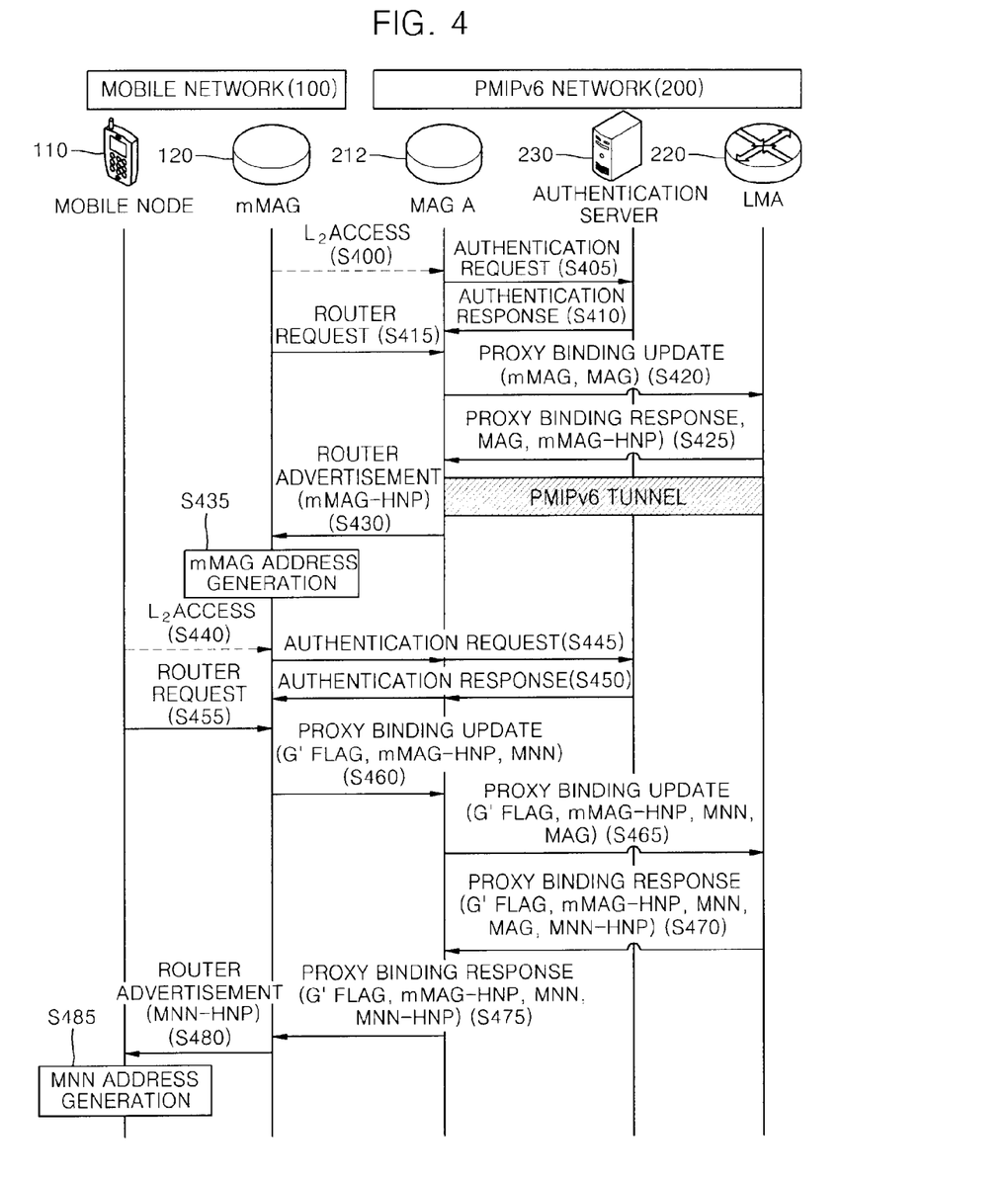
FIG. 4 is a diagram illustrating a process of a sequential access of mMAG and a mobile node to a PMIPv6 network according to an exemplary embodiment.

FIG. 4 is a diagram illustrating a process of a sequential access of the mMAG 120 and the mobile node 110 to the PMIPv6 200 network according to an exemplary embodiment;

Referring to FIG. 4, in operation S400 the mMAG 120 may access the MAG A 212. In operation S405, the MAG A 212 may detect the access of the mMAG 120 and request the authentication server 230 to authenticate. In this case, it will be assumed that the mMAG 120 is registered in the authentication 230 in advance. The MAG A 212 may verify that a node accessed to the MAG A 212 is not the mobile node 110 but the registered mMAG 120 through an authentication response message received from the authentication server 230 in operation S410, and transmit a proxy binding update message to the LMA 220 of the PMIPv6 network 200 according to a router request message received from the mMAG 120 in operation S415, to request for an allocation of a home network prefix in operation S420. In this case, the proxy binding update message transmitted from the MAG A 212 to the LMA 220 may include identification codes of the mMAG 120 and the MAG A 212.

The LMA 220 may receive the proxy binding update message from the MAG A 212, and then generate a new entry when there is no entry for the mMAG 212. In this case, information on the MAG A 212, that is, MAG that the mMAG 212 have accessed may also be stored. In operation S425, the LMA 220 may include a home network prefix mMAG-HNP for the mMAG 120 in the proxy binding response message and transmit it to the MAG A 212. In operation S430, the MAG A 212 may include the received home network prefix in a router advertisement message, and deliver it to the mMAG 120. In operation S435, the mMAG 120 may generate its own address to be used in the PMIPv6 network 200 using the home network prefix. Also, a PMIPv6 tunnel may be generated between the MAG A 212 and the LMA 220 according to the initial registration process of the mMAG 120.

When the mobile node 110 accesses the mMAG 120 in operation S440, the mMAG 120 may transmit an authentication message to the authentication server 230 through the MAG A 212 in operation S445, and receive an authentication response message from the authentication server 230 in operation S450 to verify whether provision of network mobility on the currently accessed mobile node 110 is possible.

When a router request message is received from the mobile node 110 in operation S455, the mMAG 120 may include its own home network prefix and an identification code Mnn of the mobile node 110 in a proxy binding update message, and transmit it to the MAG A 212 in operation S460.

Here, the proxy binding update message transmitted from the mMAG 120 to the MAG A 212 may further include a flag signifying that the corresponding message is a message about the mobile node 110. Accordingly, when receiving a message containing such a flag, the MAG A 212 may verify that the corresponding message is a message about the mobile node 110 pertaining to the mMAG 120, and then indicate on a proxy binding update list that the mobile node 110 corresponding to an identification code contained in the message pertains to the mMAG 120 having transmitted the corresponding message.

Figure 5:
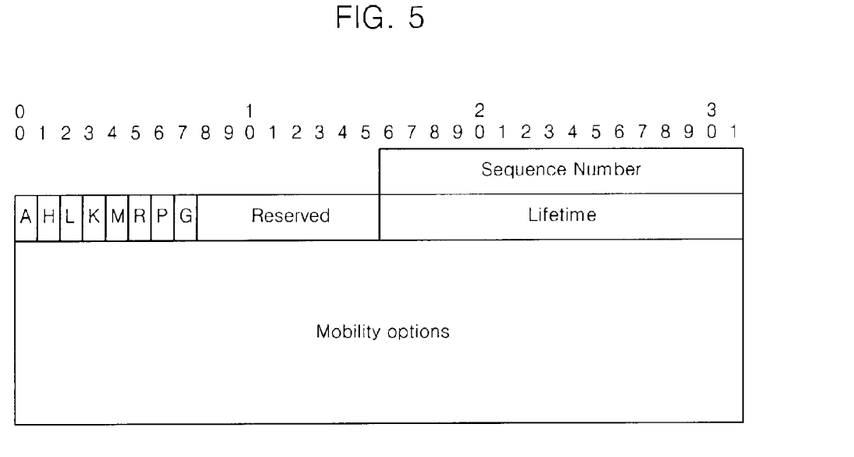
FIG. 5 is a diagram illustrating a configuration of a proxy binding update message regarding a mobile node.

FIG. 5 is a diagram illustrating a configuration of a proxy binding update message regarding a mobile node. The proxy binding update message as shown in FIG. 5 may be configured with the same format as defined in RFC 5213 standard. A flag expressed as 'G', which is located between a flag 'P' and a 'Reserved' field, may indicate that the corresponding message concerns the mobile node 110. Hereinafter, a flag contained in a message regarding the mobile node 110 may be defined as the flag 'G', but any indication method that has been predefined may also be used.

In operation S465, when the proxy binding update message containing the flag 'G' is received from the mMAG 120, the MAG A 212 may transmit a proxy binding update message to the LMA 220 again using the received proxy binding update message. The proxy binding update message transmitted from the MAG A 212 to the LMA 220 may also have the same configuration as the configuration including the flag 'G' as shown in FIG. 5. This is because the proxy binding update message is a message of requesting for a home network prefix. The LMA 220 may receive the proxy binding update message from the MAG A 212 to verify that the mobile node 110 pertains to the mMAG 120, and may allocate a mobile home network prefix MNN-HNP that is a home network prefix for the mobile node 110. Also, the address information of the mMAG 120 that the flag 'G' and the mobile node 110 pertain to, and the address information of the MAG A 212 may be stored in a binding cache entry managed by the LMA 220, corresponding to the identification code of the mobile node 110.

In operation S470, the LMA 220 may include the mobile home network prefix in a proxy binding response message and transmit it to the MAG A 212. In operation S475, the MAG A 212 may generate a proxy binding response message containing the mobile home network prefix using the received mobile binding response message, and may transmit it to the mMAG 120. In this case, the proxy binding response message transmitted from the LMA 220 to the MAG A 212 and the proxy binding response message transmitted from the MAG A 212 to the mMAG 120 may both include a flag 'G' indicating that the messages concern the mobile node 110 like the proxy binding update message.

Figure 6:
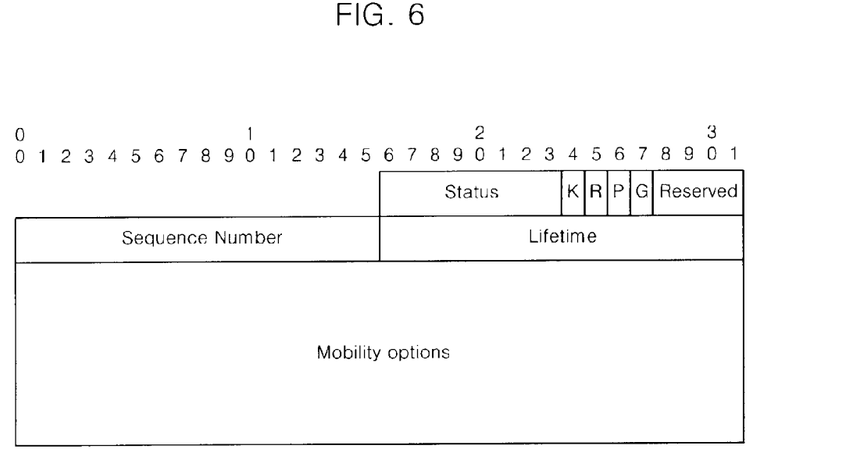
FIG. 6 is a diagram illustrating a configuration of a proxy binding response message transmitted from LMA to MAG A, and from MAG A to mMAG, respectively.

FIG. 6 is a diagram illustrating a configuration of a proxy binding response message transmitted from LMA to MAG A, and from MAG A to mMAG, respectively. The proxy binding response message may be configured with the same format as defined in RFC 5213 standard like the proxy binding update message, and a flag 'G' are added between a flag 'P' and a 'Reserved' field.

Figure 7:
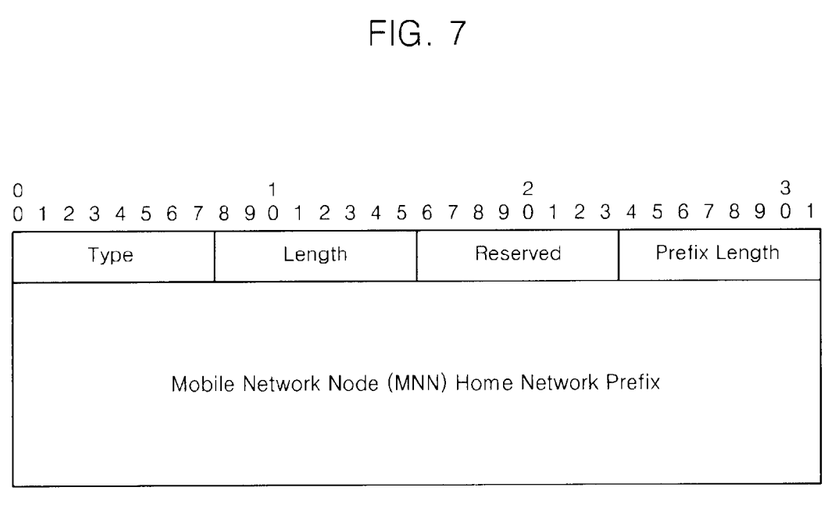
FIG. 7 is a diagram illustrating a configuration of an option header that is newly added to include a mobile home network prefix in a proxy binding response message.

FIG. 7 is a diagram illustrating a configuration of an option header that is newly added to include a mobile home network prefix in a proxy binding response message. The mobile home network prefix may use an extended header to distinguish from a home network prefix for address generation of the mMAG 120. It is possible to indicate a mobile home network prefix using 'Type' information in a header configuration shown in FIG. 7.

When the mMAG 120 receives the proxy binding response message containing the mobile home network prefix from the MAG A 212, the mMAG 120 may include the mobile home network prefix in a router advertisement message, and deliver it to the mobile node 110 via unicast in operation S480. In this case, since a plurality of mobile nodes 110 are included in the mobile network 100, the mMAG 120 may deliver the router advertisement message to the respective mobile nodes 110. In operation S485, the mobile node 110 may generate its own address using the mobile home network prefix contained in the received router advertisement message.

A cache list managed by the mMAG 120 is shown in Table 1 below.

TABLE 1

| ID Code | MNN-HNP | Lifetime | MAG |
| --- | --- | --- | --- |
| MNN1 | Pref-MNN1::/64 | 3500s | MAG A |
| MNN2 | Pref-MNN2::/64 | 3000s | MAG A |
| MNN3 | Pref-MNN3::/64 | 1000s | MAG A |

As shown in Table 1, the cache list managed by the mMAG 120 may store the mobile home network prefix and the address of the MAG A 212 that the mMAG 120 is currently accessing, corresponding to the identification codes of the respective mobile codes 110 pertaining to the mobile network 100, and may also store lifetime information for home emulation update.

A proxy binding update list managed by the MAGs 212 and 214 is shown in Table 2 below.

TABLE 2

| ID Code | HNP | Lifetime | LMA | Flag G | mMAG |
|---|---|---|---|---|---|
| mMAG1 | Pref-mMAG1::/64 | 3500 s | LMA A | no | |
| mMAG2 | Pref-mMAG2::/64 | 3500 s | LMA B | no | |
| MNN1 | Pref-MNN1::/64 | 3000 s | LMA A | yes | mMAG1 |
| MNN2 | Pref-MNN2::/64 | 1000 s | LMA B | yes | mMAG2 |
| MN1 | Pref-MNN3::/64 | 1000 s | LMA A | no | |

As shown in Table 2, when a list item concerns the mobile node 110, the flag G may be together stored. When a packet regarding a corresponding mobile node 110 is received from the LMA 220, the address of the mMAG 120 that is the address of a next hop to deliver may be together stored. However, when the list item concerns the mMAG 120, the flag G is not stored. Also, a mobile node (MN1 of Table 2) that does not pertain to the mobile network 100 may be managed according to the standard PMIPv6 procedure.

A binding cache entry managed by the LMA 220 is shown in Table 3 below.

TABLE 3

| ID Code | HNP | Lifetime | Flag G | mMAG | MAG |
|---|---|---|---|---|---|
| mMAG1 | Pref-mMAG1::/64 | 3500 s | no | | MAG A |
| MNN1 | Pref-MNN1::/64 | 3000 s | yes | mMAG1 | MAG A |
| MN1 | Pref-MN1::/64 | 1000 s | no | | MAG A |

As shown in Table 3, information on an identification code, a home network prefix, a lifetime, a flag G, and an MAG may be stored in the binding cache entry as shown in Table 2, and a MAG item may be added instead of the LMA item included in the proxy binding update list. Similarly to the proxy binding update list of Table 2, the flag G may be together stored corresponding to the identification code of the mobile node 110, and information on which mMAG 120 the corresponding mobile node 110 pertains to. The MAG item may be an item that is changed when access is moved to another MAG by handover. Also, the item expressed as MN1, which is an identification code of a mobile node that does not pertain to the mobile network 100, may be managed by the standard PMIPv6 procedure.

Figure 8:
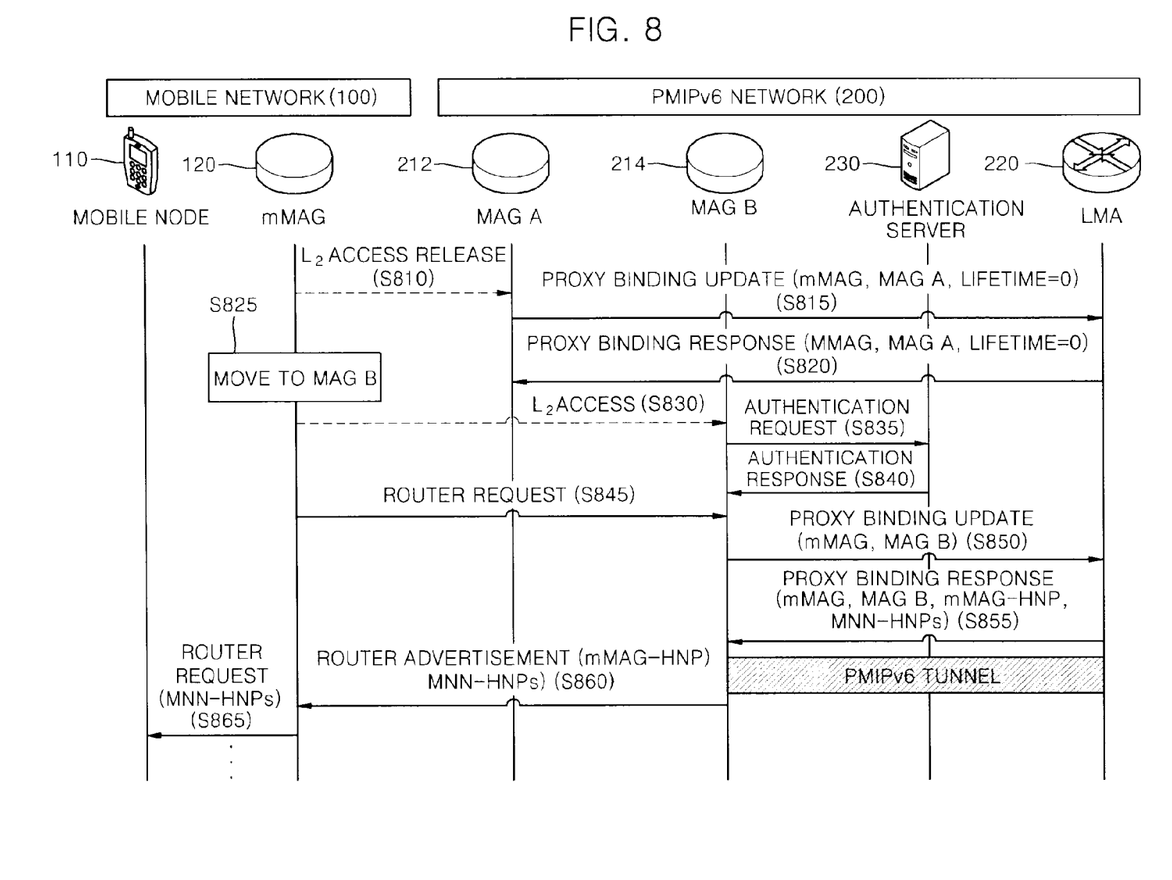
FIG. 8 is a diagram illustrating a handover procedure from MAG A to MAG B.

Hereinafter, a handover procedure managed by the mMAG 120 according to an exemplary embodiment will be described in detail. FIG. 8 is a diagram illustrating a handover procedure from MAG A 212 to MAG B 214. The handover process shown in FIG. 8 may be performed in a state where the mobile node 110 is connected to the PMIPv6 network 200 through the MAG 212, by the process as shown in FIG. 4.

Referring to FIG. 8, the mMAG 120 may release the access to the MAG A 212 for handover in operation S810. When access release of the mMAG 120 is detected through a signal of an L2 layer, in operation S815, the MAG A 212 may inform the access release by transmitting a proxy binding update message in which lifetime is represented as 0 to the LMA 220. In operation S820, the LMA 220 may transmit a proxy binding response message in which lifetime is correspondingly represented as 0 to the MAG A 212.

In operation S825, the mMAG 120 may access the MAG B 214, and, in operation S830, the MAG B 214 may detect the access of the mMAG 120 through the signal of the L2 layer. In operation S835, the MAG B 214 may request authentication from the authentication server 230 of the PMIPv6 network 200, and, in operation S840, the MAG B 214 may receive an authentication response from the authentication server 230 to verify that the mMAG 120 has been accessed.

When the mMAG 120 transmits a router request message to the MAG B 214 in operation S845, the MAG B 214 may transmit a proxy binding update message containing the identification codes of the mMAG 120 and the MAG B 214 to the LMA 220 in operation S850. The LMA 220 may receive the message to verify that the mMAG 120 has moved to the MAG B 214, and may update the 'MAG' item corresponding to the mobile nodes 110 pertaining to the corresponding mMAG 120, i.e., the mobile nodes 110 storing the address of the mMAG 120 in the mMAG item in Table 3, with the address of the MAG B 214.

In operation S855, the LMA 220 may include a home network prefix for the mMAG 120 and a mobile home network prefix for the mobile nodes 110 pertaining to the mobile network 100 in the proxy binding response message, and may transmit it to the MAG B 214. In this case, the option header of the mobile home network prefix may be distinguished from the home network prefix using the same configuration as shown in FIG. 7. Thus, when handover is performed according to the movement of the mMAG 120, a flag 'G' may not be contained in the proxy binding message transmitted between the MAG B 214 and the LMA 220.

In operation S860, the MAG B 214 may include the home network prefix and the mobile home network prefix in the router advertisement message, and deliver it to the mMAG 120. In operation S865, the mMAG 120 may again include the mobile home network prefix in the router advertisement message, and deliver it to the mobile nodes 110. Thereafter, the mMAG 120 may periodically transmit the router advertisement message containing the mobile home network prefix to the mobile nodes 110 included in the mobile network 100.

Here, it is necessary to distinguish between the home network prefix and the mobile home network prefix contained in the router advertisement message transmitted from the MAG B 214. To this end, the MAG B 214 may determine the home network prefix for the mMAG 120 as a first option message, and may determine the mobile home network prefix for the mobile node 110 as a second or later option message that is secondly or later transmitted. Accordingly, the mMAG 120 may consider the prefix contained in the router advertisement message that is first received as a home network prefix to use to generate its own address, and may consider the prefix contained in the router advertisement message that is second or later received as a mobile home network prefix to again include it in the router advertisement message and deliver it to the mobile node 110.

Figure 9:
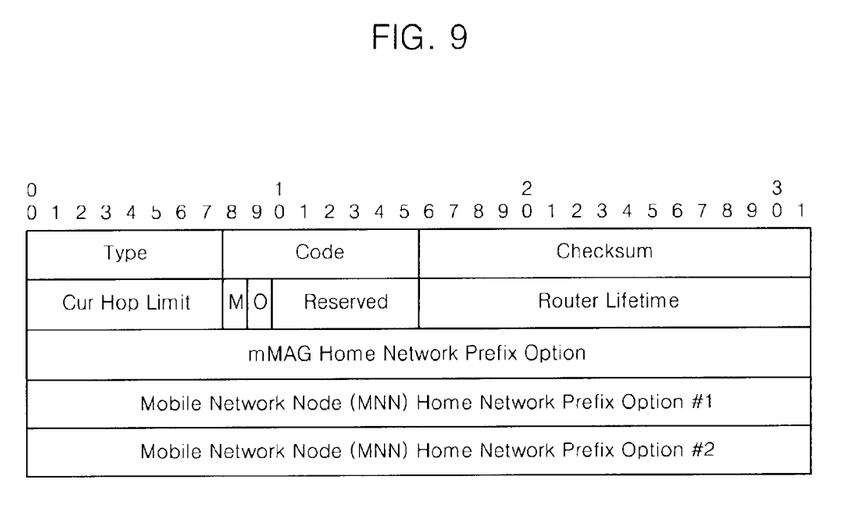
FIG. 9 is a diagram illustrating a configuration of a router advertisement message delivered from MAG B to mMAG.

FIG. 9 is a diagram illustrating a configuration of the router advertisement message delivered from the MAG B 214 to the mMAG 120. The option field of the router advertisement message that is first delivered may be a home network prefix for the mMAG 120, and the option field of the router advertisement message that is secondly or later delivered may be a mobile home network prefix for the mobile node 110.

As described above, since handover is performed by movement of the mMAG 120, the respective mobile nodes 110 pertaining to the mobile network 100 may be provided with continuity of an IP session without performing individual handover update procedures.

Figure 10:
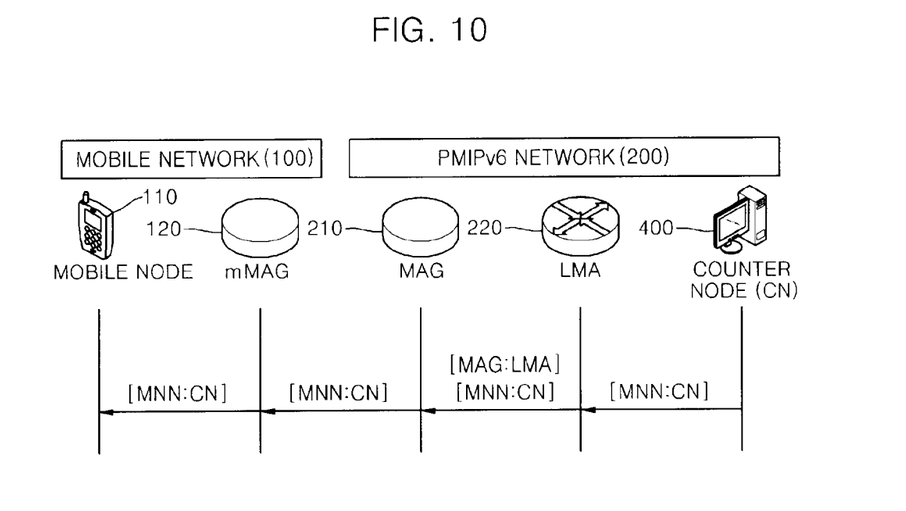
FIG. 10 is a diagram illustrating a delivery process of a data packet from a counter node pertaining to an Internet network to a mobile node pertaining to a mobile network.

FIG. 10 is a diagram illustrating a delivery process of a data packet from a counter node 400 pertaining to the Internet network 300 to the mobile node 110 pertaining to the mobile network 100.

Referring to FIG. 10, a packet data generated in the counter node 400 may be delivered to the address of the mobile node 110. The address represented in an IP header may be represented in [destination:source] format. Accordingly, the packet data generated in the counter node 400 may be represented in [MNN:CN] format. Here, MNN is an address of the mobile node, and CN is an address of the counter node 400. The packet data transmitted from the counter node 400 may be delivered to the LMA 220. Since the LMA 220 can know which MAG 210 the mobile node 110 is currently accessing through information stored in the binding cache entry, the packet data may be transmitted to the MAG 210 by adding a tunnel header of [MAG:LMA]

Since the MAG 210 having received the packet data can know that the mobile node 110 currently pertains to the mMAG 120 through the information stored in the proxy binding update list, the tunnel header represented as [MAG:LMA] may be deleted, and the packet data without an additional tunnel header may be transmitted to the mMAG 120. The mMAG 120 may verify through the cache list that the mobile node 110 is pertaining to the mobile network 100, and may deliver the packet data without an additional tunnel packet to the mobile node 110.

In contrast to FIG. 10, when packet data is delivered from the mobile node 110 to the counter node 400, the packet delivery process may be performed in a state where the order of the address information displayed in FIG. 10 is changed.

An apparatus and a method for network mobility management in a proxy mobile IPv6 network may be implemented with a separate apparatus connecting a mobile network configured with mobile nodes and a PMIPv6 network to transmit/receive messages to/from MAG of the PMIPv6 network and register the mobile node in the PMIPv6 network. Accordingly, the apparatus and the method for network mobility management in a proxy mobile IPv6 network can be applied to the PMIPv6 network without a related-art mobile IPv6 protocol. Also, since the mobile node need not perform individual handover processes upon handover, the speed of handover increases and signaling cost can be reduced.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

Although the apparatus and the method for network mobility management in a proxy mobile IPv6 network been described with reference to the specific embodiments, they are not limited thereto. Therefore, it will be readily understood by those skilled in the art that various modifications and changes can be made thereto without departing from the spirit and scope of the present invention defined by the appended claims.

What is claimed is:

1. A network mobility management apparatus for providing mobility in a proxy mobile Internet Protocol (IP) network of mobile nodes which configure a mobile network, the network mobility management apparatus comprising:
an address generation unit transmitting a router request message to a mobile access gateway of a proxy mobile IP network to be accessed by each mobile node, and receiving a router advertisement message comprising a home network prefix to generate a network address; and
a communication unit transmitting a proxy binding update message containing the home network prefix and an identification code of the mobile node to the mobile access gateway when a router request message is received from the mobile node, and adding a mobile home network prefix, which is contained in a proxy binding response message received from the mobile access gateway and is for the mobile node, to the router advertisement message to be transferred to the mobile node.

2. The network mobility management apparatus of claim 1, wherein the proxy binding update message transmitted to the mobile access gateway and the proxy binding response message received from the mobile access gateway further contain a flag indicating a message for the mobile node.

3. The network mobility management apparatus of claim 1, wherein the mobile node which receives the router advertisement message containing the mobile home network prefix generates a mobile address by using the mobile home network prefix.

4. The network mobility management apparatus of claim 1, wherein the mobile access gateway transmits a proxy binding update message to a local mobility anchor of the proxy mobile IP network by using the proxy binding update message received from the communication unit, and receives the proxy binding response message containing the mobile home network prefix from the local mobility anchor to transfer the proxy binding response message to the communication unit.

5. The network mobility management apparatus of claim 4, wherein the proxy binding update message transmitted from the mobile access gateway to the local mobility anchor and the proxy binding response message transmitted from the local mobility anchor to the mobile access gateway further contain a flag indicating a message for the mobile node.

6. The network mobility management apparatus of claim 4, wherein the mobile access gateway adds the identification code of the mobile node, which is contained in the proxy binding update message received from the communication unit, to a proxy binding update list and stores a flag indicating a message for the mobile node and the network address generated by the home network prefix corresponding to the added identification code of the mobile node.

7. The network mobility management apparatus of claim 4, wherein a binding cache entry managed by the local mobility anchor stores a flag indicating the mobile node, the network address generated by the home network prefix and an address of the mobile access gateway transmitting/receiving a message to/from the communication unit corresponding to the identification code of the mobile node.

8. The network mobility management apparatus of claim 1, wherein the communication unit removes access with a first mobile access gateway of the proxy mobile IP network, accesses a second mobile access gateway to transmit a router request message, and transfers the router advertisement message containing the mobile home network prefix for the mobile nodes when the router advertisement message containing the mobile home network prefix for the mobile nodes and the home network prefix is received from the second mobile access gateway.

9. The network mobility management apparatus of claim 8, wherein the first mobile access gateway transmits a proxy binding update message having a lifetime set as 0 to the local mobility anchor of the proxy mobile IP network when access removal of the communication unit is sensed, and receives a proxy binding response message having a lifetime set as 0 from the local mobility anchor.

10. The network mobility management apparatus of claim 8, wherein the communication unit generates a network address on the basis of a home network prefix contained in a first router advertisement message received from the second mobile access gateway, and adds a mobile network prefix, which is contained in a router advertisement message succeeding a second router advertisement message, to a router advertisement message to be transferred to the mobile nodes.

11. The network mobility management apparatus of claim 8, wherein the second mobile access gateway receiving the router request message from the communication unit transmits a proxy binding update message containing an identification code of the second mobile access gateway to the local mobility anchor of the proxy mobile IP network, and adds the mobile network prefix and the home network prefix, which are contained in the proxy binding response message received from the local mobility anchor, to a router advertisement message to transmit the router advertisement message to the communication unit.

12. The network mobility management apparatus of claim 11, wherein:
   a binding cache entry managed by the local mobility anchor stores a flag indicating the mobile node, the network address generated by the home network prefix and an identification code of the mobile access gateway transmitting/receiving a message to/from the communication unit corresponding to the identification code of the mobile node, and
   the local mobility anchor changes the stored identification code of the mobile access gateway to the identification code of the second mobile access gateway when a proxy binding update message containing the identification code of the second mobile access gateway is received from the second mobile access gateway.

13. A network mobility management method for providing mobility in a proxy mobile Internet Protocol (IP) network of mobile nodes which configure a mobile network, the network mobility management apparatus comprising:
   transmitting a router request message to a mobile access gateway of a proxy mobile IP network to be accessed by each mobile node, and receiving a router advertisement message containing a home network prefix to generate a network address;
   transmitting a proxy binding update message containing the home network prefix and an identification code of the mobile node to the mobile access gateway when the router request message is received from the mobile node; and
   adding a mobile home network prefix, which is contained in a proxy binding response message received from the mobile access gateway and is for the mobile node, to the router advertisement message to be transferred to the mobile node.

14. The network mobility management method of claim 13, wherein the proxy binding update message transmitted to the mobile access gateway and the proxy binding response message received from the mobile access gateway further contain a flag indicating a message for the mobile node.

15. The network mobility management method of claim 13, wherein the mobile node which receives the router advertisement message containing the mobile home network prefix generates a mobile address by using the mobile home network prefix.

16. The network mobility management method of claim 13, wherein in the adding of the mobile home network prefix, the mobile access gateway transmits a proxy binding update message to a local mobility anchor of the proxy mobile IP network by using the proxy binding update message and receives the proxy binding response message containing the mobile home network prefix from the local mobility anchor, and thereby the proxy binding response message is transferred.

17. The network mobility management method of claim 16, wherein the proxy binding update message transmitted from the mobile access gateway to the local mobility anchor and the proxy binding response message transmitted from the local mobility anchor to the mobile access gateway further contain a flag indicating a message for the mobile node.

18. The network mobility management method of claim 16, wherein the mobile access gateway adds the identification code of the mobile node, which is contained in the proxy binding update message received from a communication unit, to a proxy binding update list and stores a flag indicating a message for the mobile node and the network address generated by the home network prefix corresponding to the added identification code of the mobile node.

19. The network mobility management method of claim 16, wherein a binding cache entry managed by the local mobility anchor stores a flag indicating the mobile node, the network address generated by the home network prefix and an address of the mobile access gateway transmitting/receiving a message to/from a communication unit corresponding to the identification code of the mobile node.

20. The network mobility management method of claim 13, further comprising:
   removing access with a first mobile access gateway of the proxy mobile IP network, and accessing a second mobile access gateway to transmit a router request message; and
   transferring the router advertisement message containing the mobile home network prefix to the mobile nodes when the router advertisement message containing the mobile home network prefix for the mobile nodes and the home network prefix is received from the second mobile access gateway.

21. The network mobility management method of claim 20, wherein the first mobile access gateway transmits a proxy binding update message having a lifetime set as 0 to the local mobility anchor of the proxy mobile IP network when the removal of access is sensed, and receives a proxy binding response message having a lifetime set as 0 from the local mobility anchor.

22. The network mobility management method of claim 20, wherein the transferring of the router advertisement message generates an address on the basis of a home network prefix contained in a first router advertisement message received from the second mobile access gateway, and adds a mobile network prefix, which is contained in a router advertisement message succeeding a second router advertisement message, to a router advertisement message to be transferred to the mobile nodes.

23. The network mobility management method of claim 20, wherein:
   the second mobile access gateway, which receives the router request message through the removing of access, transmits a proxy binding update message containing an identification code of the second mobile access gateway to the local mobility anchor of the proxy mobile IP network, and the router advertisement message, which is received through the transferring of the router advertisement message, contains the mobile network prefix and the home network prefix which are contained in the proxy binding response message received by the second mobile access gateway from the local mobility anchor.

24. The network mobility management method of claim 23, wherein:

a binding cache entry managed by the local mobility anchor stores a flag indicating the mobile node, the network address generated by the home network prefix and an identification code of the mobile access gateway transmitting/receiving a message to/from a communication unit corresponding to the identification code of the mobile node, and the local mobility anchor changes the stored identification code of a mobile access gateway to the identification code of the second mobile access gateway when a proxy binding update message containing the identification code of the second mobile access gateway is received from the second mobile access gateway.

* * * * *